(12) United States Patent
Fong et al.

(10) Patent No.: US 7,484,120 B2
(45) Date of Patent: **\*Jan. 27, 2009**

(54) DUAL PROTOCOL LAYER AUTOMATIC RETRANSMISSION REQUEST SCHEME FOR WIRELESS AIR INTERFACE

(75) Inventors: Mo-Han Fong, L'Orignal (CA); Leo L. Strawczynski, Ottawa (CA); Geng Wu, Plano, TX (US); Wen Tong, Ottawa (CA)

(73) Assignee: Nortel Networks Limited, St. Laurent, Quebec (CA)

( \* ) Notice: Subject to any disclaimer, the term of this patent is extended or adjusted under 35 U.S.C. 154(b) by 624 days.

This patent is subject to a terminal disclaimer.

(21) Appl. No.: 11/168,835

(22) Filed: Jun. 28, 2005

(65) Prior Publication Data

US 2005/0237994 A1 Oct. 27, 2005

Related U.S. Application Data

(63) Continuation of application No. 09/836,488, filed on Apr. 17, 2001, now Pat. No. 6,931,569.

(60) Provisional application No. 60/197,553, filed on Apr. 17, 2000.

(51) Int. Cl.
*G06F 11/00* (2006.01)

(52) U.S. Cl. .......................... 714/18; 714/748; 370/913

(58) Field of Classification Search .................. 714/18, 714/748, 749; 370/913
See application file for complete search history.

(56) References Cited

U.S. PATENT DOCUMENTS 5,677,918 A 10/1997 Tran et al.
5,754,754 A 5/1998 Dudley et al.
5,963,559 A 10/1999 Ohki
6,289,054 B1 9/2001 Rhee
6,760,860 B1 \* 7/2004 Fong et al. ...................... 714/4
6,931,569 B2 \* 8/2005 Fong et al. ...................... 714/18
7,054,316 B2 \* 5/2006 Cheng et al. ................. 370/394
2001/0007137 A1 7/2001 Suumaki et al.
2007/0159985 A1 \* 7/2007 Sunell et al. ................. 370/254

OTHER PUBLICATIONS

Eckhardt D A, Steenkiste P, Improving Wireless LAN Performance via adaptive local error control, Proceedings Sixth International Conference on Network Protocols, Austin, TX, USA IEEE Comput. Soc, USA Oct. 13-16, 1998.

Chuah M C, Doshi B T, Dravida S, Ejzak RP, Nanda S, Performance Comparisons of two Retransmission Protocols for CDMA, 996 IEEE 46th Vehicular Technology Conference Mobile Technology for the Human Race, vol. 1, Apr. 28, 1996-May 1, 1996.

\* cited by examiner

*Primary Examiner*—Christopher S McCarthy
(74) *Attorney, Agent, or Firm*—Garlick Harrison & Markison; Bruce E. Garlick

(57) ABSTRACT

A base station, mobile station, and/or other terminal device includes physical layer (layer 1) protocol and link layer (layer 2) protocol that both include automatic retransmission request (ARQ) operations. The physical layer and link layer include enhancements that interact with one another to cause the link layer to inhibit ARQ operations while error recovery operations are pending at the physical layer. A transmitter packages link layer packet data units into physical layer frames and transmits the physical layer frames. A receiver responds to indicate either successful or unsuccessful transmission. The transmitting physical layer waits for the response and initiates error recovery operations when required. The receiving link layer, when it detects lost data packets, inhibits its ARQ operations to allow physical layer error recovery operations to complete.

43 Claims, 12 Drawing Sheets

DUAL PROTOCOL LAYER AUTOMATIC RETRANSMISSION REQUEST SCHEME FOR WIRELESS AIR INTERFACE

CROSS-REFERENCE TO RELATED AND PRIORITY APPLICATIONS

The present application is a continuation of Utility application Ser. No. 09/836,488, filed Apr. 17, 2001, now issued as Utility U.S. Pat. No. 6,931,569, issued Aug. 16, 2005, which claims priority pursuant to 35 U.S.C. Sec 119(e) to U.S. Provisional Application Ser. No. 60/197,553, filed Apr. 17, 2000, which is hereby incorporated by reference in its entirety.

BACKGROUND

1. Technical Field

The present invention relates generally to cellular wireless networks; and more particularly to the servicing of packetized communications within such cellular wireless networks.

2. Related Art

Wireless networks are well known. Cellular wireless networks support wireless communication services in many populated areas of the world. While wireless networks were initially constructed to service voice circuit-switched voice communications, they are now called upon to support packet-switched data communications as well.

The transmission of packetized data communications within a wireless network places different demands on networks than does the transmission of voice communications. Voice communications require a sustained bandwidth with minimum signal-to-noise ratio (SNR) and continuity requirements. Data communications, on the other hand, typically are latency tolerant but have higher total throughput requirements. Conventional circuit-switched wireless networks were designed to support the well-known voice communication requirements. Thus, wireless networks (as well as conventional circuit switched telephone networks) have been adapted to service data communications, with such adaptation providing mixed results. Thus, future wired and wireless networks will likely be fully packet switched.

The Internet, Intranets, Wide Area Networks, and Local Area Networks are all packet switched networks. In such packet switched networks, all communications to be transmitted from a source to a destination are packetized prior to transmission and reassembled upon receipt. These networks are capable of servicing both data communications and Voice Over Internet Protocol (VOIP) communications. Because of the requirement of interoperability between the equipment of differing vendors, various interworking standards have been developed for packet switched networks. Many operating standards of this type are based upon hierarchical protocol systems, e.g., the Industry Standards Organization (ISO) seven layer Open Systems Interconnect (OSI) model, the TCP/IP model, etc. The OSI model includes, from lowest protocol layer to highest protocol layer, (1) the physical layer, (2) the data link layer, (3) the network layer, (4) the transport layer, (5) the session layer, (6) the presentation layer, and (7) the application layer. A corresponding TCP/IP reference model includes (1) the physical layer, (2) the network interface layer, (3) the Internet layer, (4) the transport layer, and (5) the application layer. Networked devices, e.g. computer terminals, wireless network mobile stations, etc., operating according to these standards support error free transfer of data communications. Thus, almost all devices supporting data communications operate according to one or more variations of these operating standards.

In order to ensure that packets lost in transmission are retransmitted, the operating standards sometimes employ Automatic Retransmission request (ARQ) operations. Generally speaking, ARQ operations are employed to automatically request retransmission of data packets that have been transmitted but not successfully received, e.g., lost data packets, erroneous data packets, etc.

For example, in a data session established between a client computer and a web server across the Internet, the client computer requests the download of a file. The web server accesses the file, subdivides the requested file into a plurality of data packets, and uniquely identifies each data packet. The web server then transmits each of the data packets to the client computer. Upon receipt of all of the data packets, the client computer combines the data packets in the correct order to reconstruct the file. However, the client computer may not successfully receive all of the data packets from the web computer due to lost/erroneous transmissions. When this occurs, the client computer automatically sends a request to the web server to retransmit a lost/erroneously-received packet. ARQ operations continue until the client computer correctly receives all data packets that make up the file.

ARQ operations are particularly important in wireless networks, e.g., cellular networks that include wireless links between a base station and a serviced mobile station. Wireless links are subject to interference, fading, and other factors that oftentimes prevent the successful transmission of data packets. Thus, in such systems, ARQ operations are particularly important and are implemented between the serviced mobile station and the servicing base station. These ARQ operations are different than the ARQ operations described above since the base station does not serve as an end point to the serviced communication. However, existing ARQ schemes require significant overhead and heretofore have not provided required robustness without incurring significant additional overhead and without oftentimes resulting in unneeded retransmissions.

Thus, there exists a need in the art for ARQ operations in wireless networks that will provide robust operations across the wireless link and that will also consume little additional overhead.

SUMMARY OF THE INVENTION

The present invention is directed to apparatus and methods of operation that are further described in the following Brief Description of the Drawings, the Detailed Description of the Drawings, and the Claims. Other features and advantages of the present invention will become apparent from the following description made with reference to the accompanying drawings.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1:
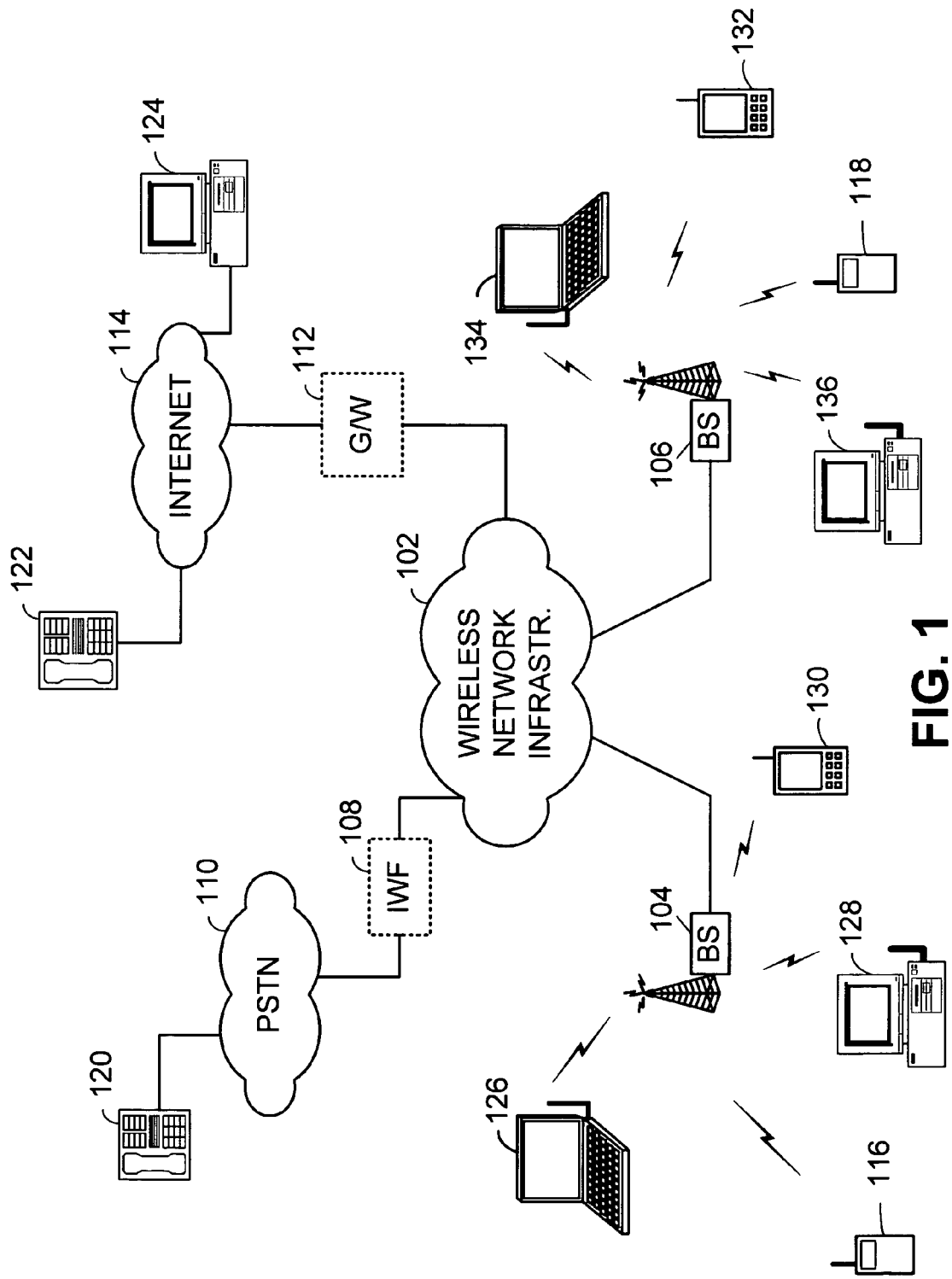
FIG. 1 is a system diagram illustrating a portion of a cellular wireless network constructed according to the present invention.

FIG. 1 is a system diagram illustrating a portion of a cellular wireless network constructed according to the present invention. The cellular wireless network includes a wireless network infrastructure 102, base station 104, and base station 106. The cellular wireless network operates according to an operating standard that may have been modified according to the present invention, e.g., HSDPA, 1xEV, etc. However, the operations of the present invention may be implemented in some cases without modification of existing standards. The wireless network infrastructure 102 couples to the Internet 114 and also to the Public Switched Telephone Network (PSTN) 110. In one embodiment of the present invention, the network infrastructure 102 is circuit switched, couples directly to the PSTN 110, and couples to the Internet 114 via a gateway (G/W) 112. In another embodiment of the present invention, the network infrastructure is packet switched, couples directly to the Internet 114, and couples to the PSTN 110 via an interworking function (IWF) 108.

A conventional voice terminal 120 couples to the PSTN 110. A VoIP terminal 122 and a personal computer 124 couple to the Internet 114. Mobile stations 116, 118, 126, 128, 130, 132, 134, and 136 wirelessly couple to the wireless network via wireless links with the base stations 104 and 106. As illustrated, mobile stations may include cellular telephones 116 and 118, laptop computers 126 and 134, desktop computers 128 and 136, and data terminals 130 and 132. However, the wireless network supports communications with other types of mobile stations as well.

Each of the base stations 104 and 106 services a cell/set of sectors within which it supports wireless communications. Wireless links that include both forward link components and reverse link components support wireless communications between the base stations and their serviced mobile stations. These wireless links support both data communications and multimedia communications, such as VoIP. The teachings of the present invention may be applied equally to any type of packetized communication.

Each of the base stations 106 and 108 and at least some of the mobile stations 116, 118, 126, 128, 130, 132, 134, and 136 support layer 1 (physical layer) ARQ and layer 2 (link layer) ARQ operations. Further, according to the present invention, layer 1 ARQ operations work in cooperation with layer 2 ARQ operations to avoid unnecessary retransmission requests. Generally speaking, layer 1 ARQ operations perform a number of retries in attempting to recover lost physical layer frames of data. Further, layer 2 delays initiation of its ARQ operations to recover lost link layer packet data units during the pendency of layer 1 ARQ operations. These operations will be described in detail with reference to FIGS. 4-10.

In the particular embodiment of FIG. 1, the link layer is a radio link protocol (RLP) layer that performs ARQ operations. The radio link protocol is a fairly widely used link layer protocol within wireless networks. The RLP layer provides robust operations across wireless links. Layer 1 of the present invention may be implemented according to any wireless operating standard that implements ARQ operations. By including two levels of ARQ operations, layer 1 ARQ operations provide a quick recovery for physical layer frames that are lost or received erroneously through retransmission of the physical layer frames. The second level (RLP) ARQ operations provide a more robust recovery at the RLP layer.

Figure 2:
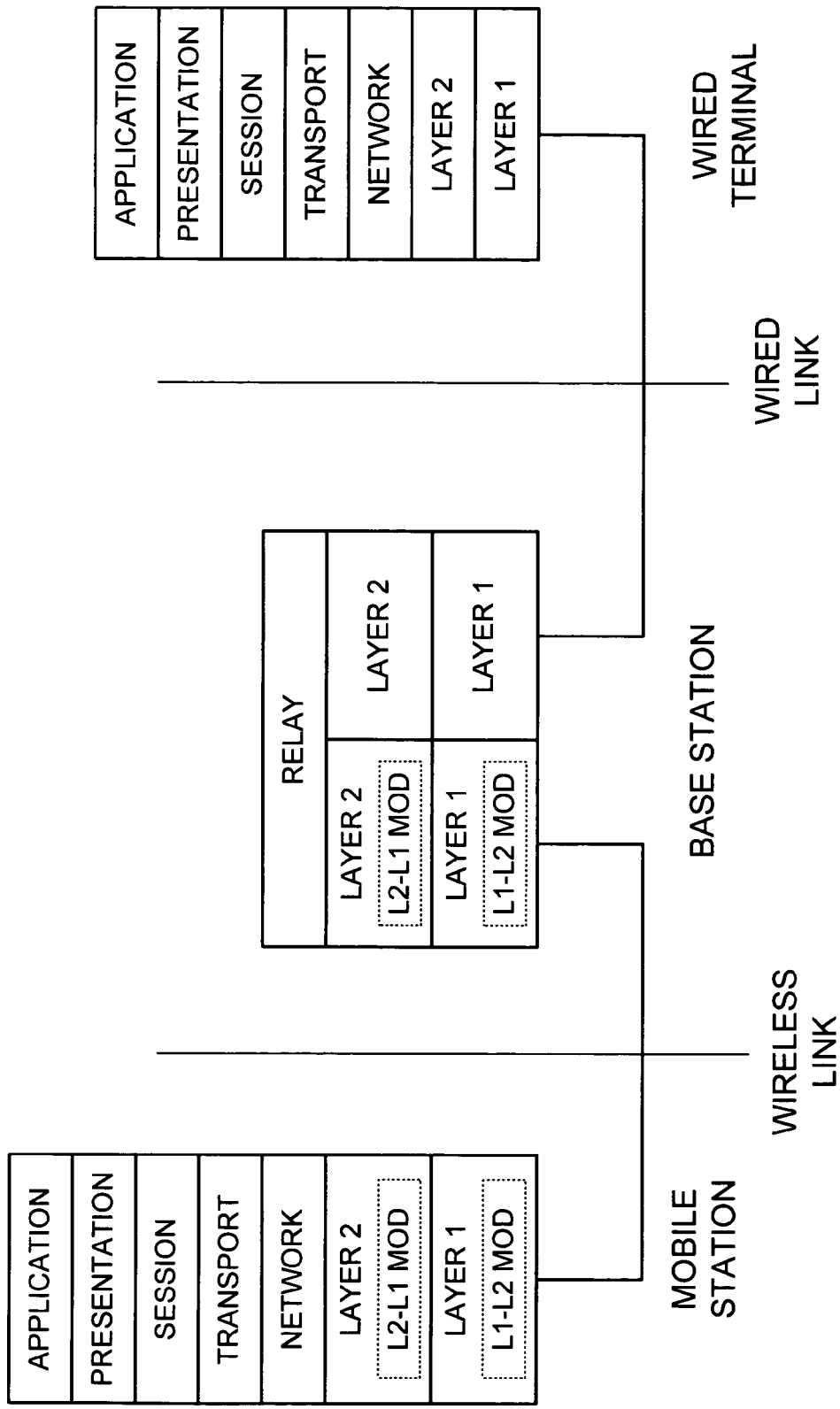
FIG. 2 is a block diagram illustrating the Open Systems Interconnection (OSI) components residing upon a base station and/or a mobile station according to a first embodiment of the present invention.

FIG. 2 is a block diagram illustrating the Open Systems Interconnection (OSI) components residing upon a base station and/or a mobile station according to a first embodiment of the present invention. As shown, the mobile station supports all seven ISO protocol layers. The base station may also support all seven ISO protocol layers. However, in the example of FIG. 2, the base station supports only the physical layer and link layer in servicing a communication between the mobile station and a wired terminal. In this operating scenario, the base station simply relays layer 2 packets between the mobile station and a wired terminal that participates in a communication session with the mobile station.

The protocol layer operations of FIG. 2 are compliant with one of a number of various standards, e.g., 1xEV, HSDPA, or another various standards. These standards will typically include both layer 1 and layer 2 components. While layer 1 is typically referred to as the physical layer, layer 2 is referred to using various terms, the particular term, e.g., Radio Link Protocol (RLP), etc., used dependent upon the standard. The teachings of the present invention may be applied to any operating standard in which layer 1 and layer 2 both support ARQ operations.

The teachings of the present invention may be applied to various ARQ operations. For example, some ARQ operations employ a "stop-and-wait" (SAW) methodology in which packets are recovered in order. However, some other ARQ operations do not recover packets in order, e.g., Motorola's dual channel SAW, 1xEV-DO's 4 channel SAW, Lucent's asynchronous Incremental Redundancy, and Nortel's NCP (Non-complete Puncture), among others. The teachings of the present invention apply to any of these methodologies.

As is illustrated in FIG. 2, layer 1 and layer 2 of both the mobile station and the base station have been modified according to the present invention. In particular, layer 1 includes a L1-L2 modification while layer 2 includes a L2-L1 modification. As modified, layer 1 reports the number of packets pending with its ARQ operations. Such reporting is performed with the presentation of each valid data packet to layer 2 and each with erasure indication to layer 2. In accordance with the L2-L1 modification, layer 2 will not initiate ARQ operations for data blocks having missing data packets while layer 1 ARQ operations are still pending for the data blocks. These operations will be described further with reference to FIGS. 4-8.

Figure 3A:
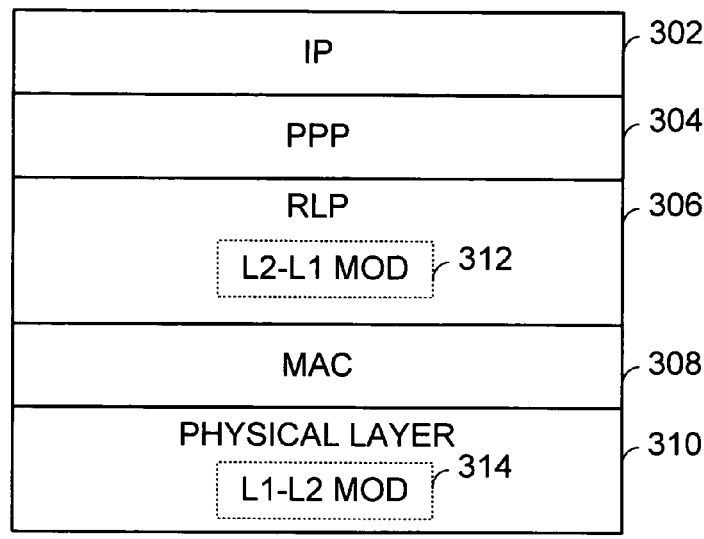
FIG. 3A is a block diagram illustrating the OSI layer components residing upon a network infrastructure component and/or a mobile station according to a second embodiment of the present invention.

FIG. 3A is a block diagram illustrating the OSI layer components residing upon a mobile station and/or upon a plurality of network infrastructure components according to a second embodiment of the present invention. As shown in FIG. 3A, the ISO protocol components include an Internet Protocol (IP) layer 302, a Point-to-Point protocol (PPP) layer 304, a Radio Link Protocol (RLP) layer 306, a media access control (MAC) layer 308, and a physical layer 310. As was the case with the embodiment of FIG. 2, the RLP layer 306 includes an L2-L1 modification 312. Further, physical layer 310 includes an L1-L2 modification 314 each of which operates according to the principles of the present invention.

Figure 3B:
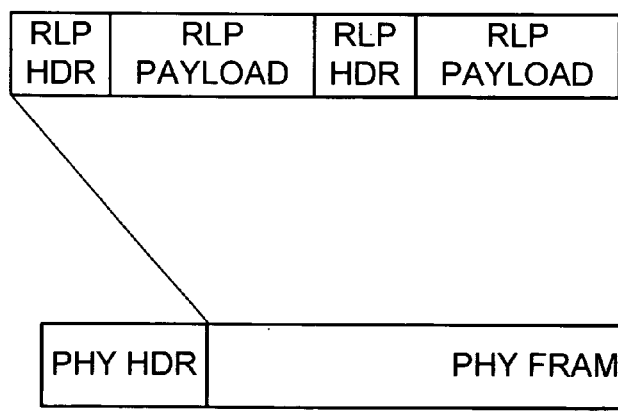
FIG. 3B is a block diagram illustrating the manner in which Radio Link Protocol packet data units may be packaged into a physical layer frame.
Figure 3B:
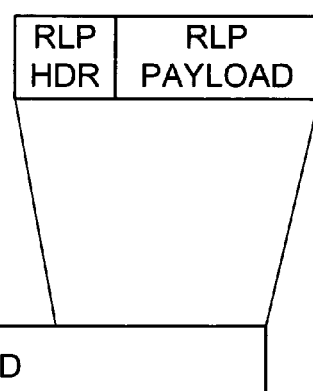

FIG. 3B is a block diagram illustrating the manner in which RLP packet data units may be packaged into a physical layer frame. Each physical layer frame includes a physical layer header and a physical layer frame payload. Each of the physical layer frame payloads may include one or more RLP packet data units. In the particular instance of FIG. 3B, the physical layer frame includes RLP packet data units for two separate instances of the RLP layer. As will be described further herein, the principles of the present invention may be applied when one or more separate RLP instances share a physical layer for their transmission.

Each of the RLP packet data units includes a RLP header and a RLP payload. Each of the RLP packet data units is uniquely identified, with packet data unit sequence number. According to the present invention, the ARQ operations of the RLP layer use these sequence numbers.

Figure 4:
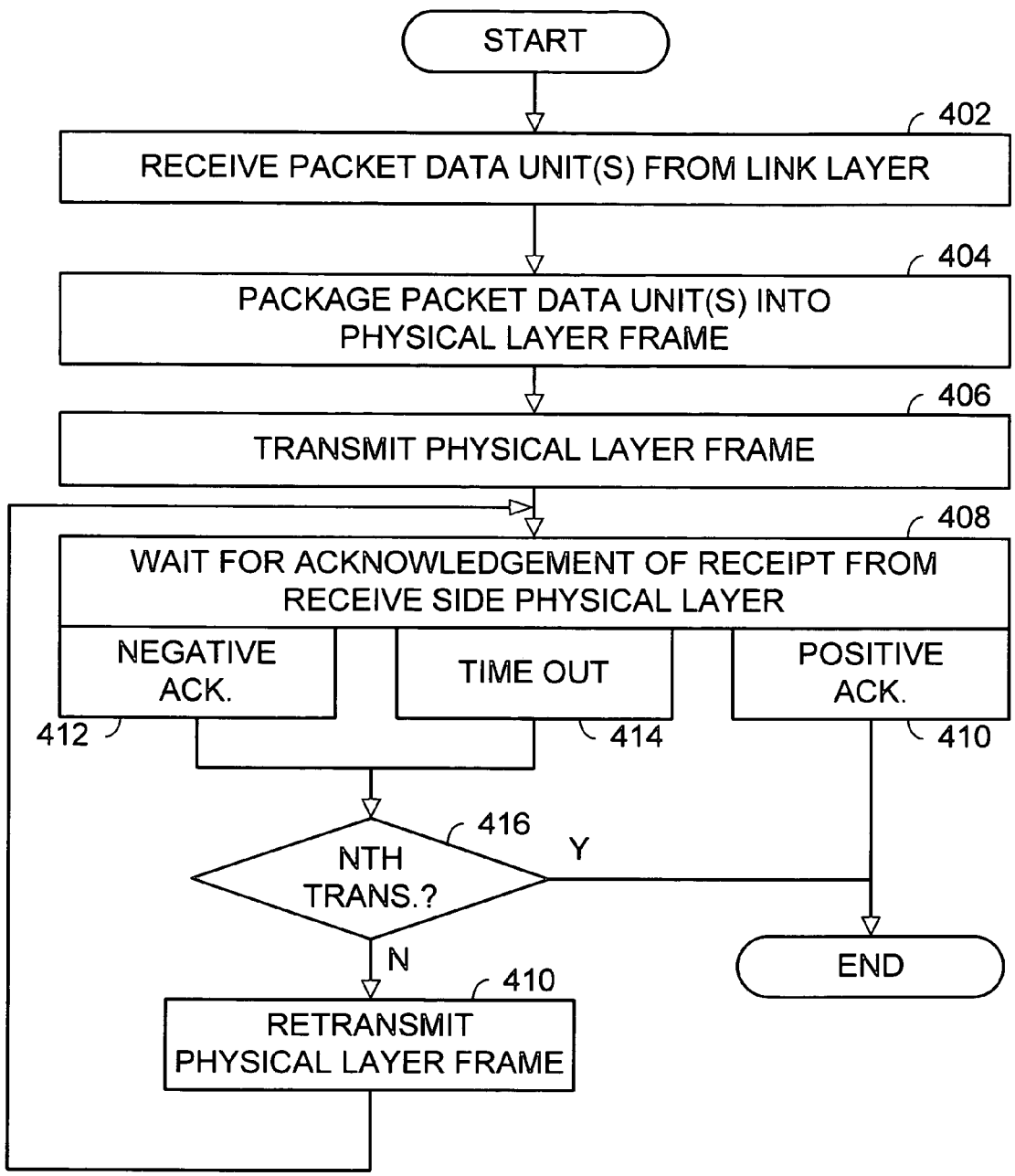
FIG. 4 is a logic diagram illustrating transmit side physical layer operations according to the present invention.

FIG. 4 is a logic diagram illustrating transmit side physical layer operations according to the present invention. The operations shown in FIG. 4 will be repeated for each packet data unit received by the physical layer from the link layer. Operation commences wherein the physical layer receives at least one packet data unit from the link layer (step 402). Upon receipt of the packet data units from the link layer, the physical layer packages the packet data unit(s) into a physical layer frame (step 404). Then, the physical layer transmits the physical layer frame across the wireless link to a receiver across a wireless link (step 406). Note that in another embodiment in which a lower data rate is supported, each packet data unit may be packaged into multiple physical layer frames. The principles described herein may be applied to such embodiment without departing from the scope of the present invention.

In a particular example of use of the present invention, operation is supported between a base station such as base station 104 of FIG. 1 and a wireless mobile station such as wireless terminal 130 of FIG. 1. The principles of the present invention may be embodied in the base station 104 and/or the mobile station 130 as was shown particularly in FIG. 2 and described with reference thereto. In the particular examples described herein with reference to FIGS. 4-10, the base station 104 is considered the transmitter and the mobile station 130 is considered the receiver. However, each of the base station 104 and the mobile station 104 may support both transmit side and receive side operations.

Once the transmit side physical layer has transmitted the physical layer frame, it waits for an acknowledgment of receipt from the receive side physical layer (step 408). However, the transmit side physical layer only waits for a period of time before it presumes that the receive side physical layer has not successfully received the physical layer frame. In particular, consider that the base station 104 of FIG. 1 is the transmitting device and mobile station 130 is the receiving device. In such case, the base station transmits the physical layer frame and waits for an acknowledgment from the mobile station 130. If the mobile station acknowledges that the physical layer frame was not correctly received (step 412) or the transmit side physical layer meets a timeout condition (step 414) operation proceeds to step 416. However, if the transmit side physical layer receives a positive acknowledgment (step 410) operation for the particular physical layer frame is complete.

If a negative acknowledgment is received or if a timeout condition occurs (steps 412 or 414), the transmit side physical layer considers whether or not the current transmission of the physical layer frame was the Nth transmission attempt (step 416). According to the present invention, the transmit side physical layer will attempt N transmissions of any physical layer frame before it ceases its ARQ operations. Thus, if the current transmission of physical layer frame by the transmit side physical layer is not the Nth transmission of the physical layer frame, operation proceeds to step 410 where the transmit side physical layer retransmits the physical layer frame across the wireless link. Then, operation returns to step 408 where the transmit side physical layer waits for an acknowledgment of receipt from the receiving physical layer. If a positive acknowledgment is received at step 410, or N transmissions of the physical layer frame are unsuccessful as determined at step 416, operation for the particular physical layer frame ends.

Figure 5:
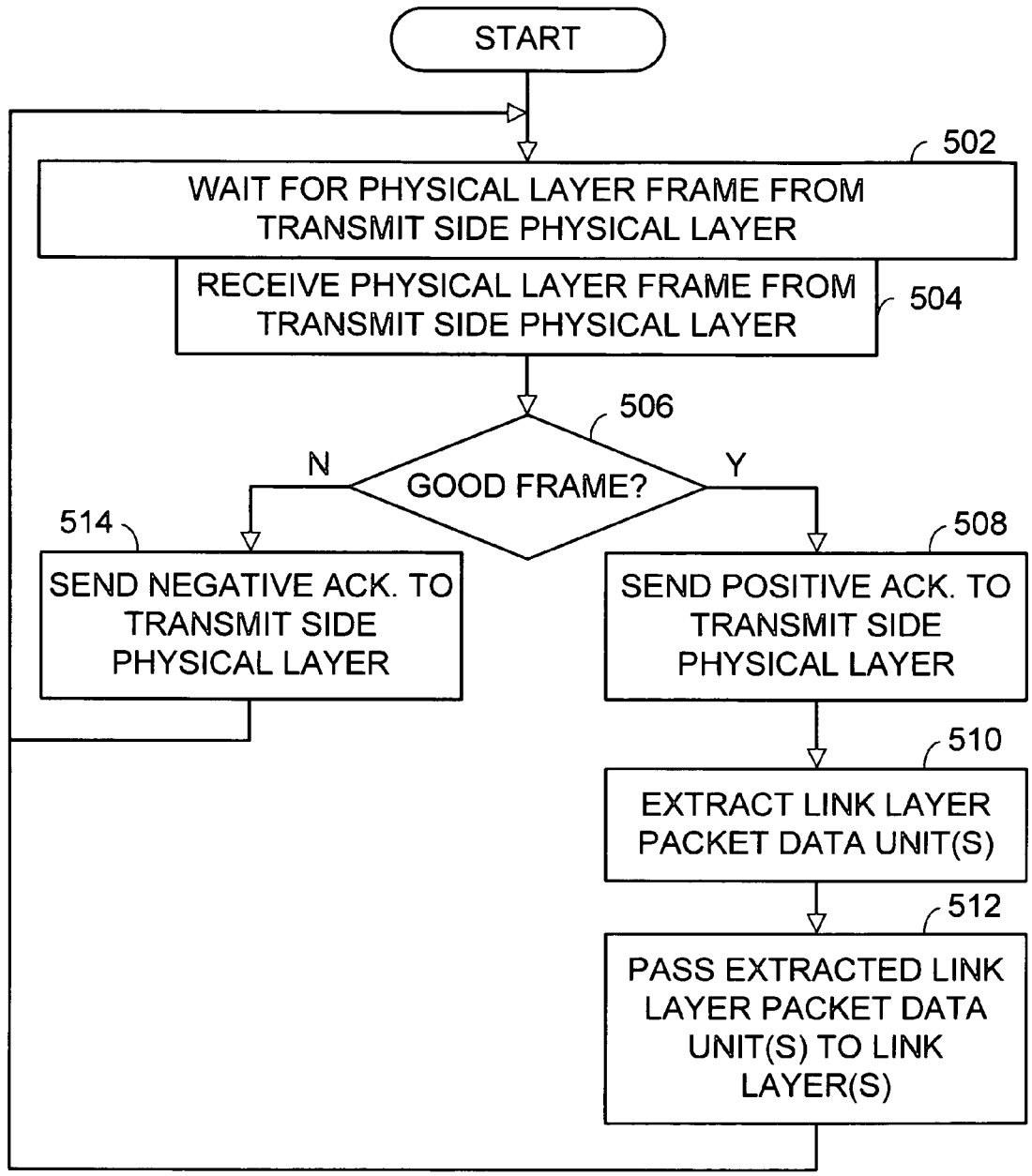
FIG. 5 is a logic diagram illustrating receive side physical layer operations according to the present invention.

FIG. 5 is a logic diagram illustrating receive side physical layer operations according to the present invention. The receive side physical layer operations wait for physical layer frames to arrive from the transmit side (step 502) When the receive side physical layer receives a physical layer frame from the transmit side physical layer (step 504), it determines whether the received physical layer frame is a good physical layer frame (step 506). This determination is based upon a forward error correction operation supported by the physical layer, by checksum operations, or by another error checking algorithm employed by the transmit side and receive side physical layers.

If the receive side physical layer determines that the physical layer frame is not a good physical layer frame, at step 506, the receive side physical layer sends a negative acknowledgment to the transmit side physical layer (step 514). Then, operation returns to step 502 with the receive side physical layer awaiting another physical layer frame.

If the determination at step 506 is that the physical layer frame is a good physical layer frame, the receiving physical layer will send a positive acknowledgment to the transmit side physical layer (step 508). Then, the receive side physical layer extracts the link layer packet data unit or units from the physical layer frame (step 510). Then, the receive side physical layer passes the extracted link layer packet data units to the link layer or layers that are serviced by the physical layer (step 512).

ARQ operations at the physical layer depend upon a fast feedback from the receive side to a transmit side. In one embodiment, the positive or negative acknowledge (ACK) signal is sent on a fast reverse feedback-signaling channel. One specific implementation of the ACK signaling is to use one bit to indicate good or bad reception. For example, the value 1 may be used to indicate a good received physical layer frame and the value 0 may be used to indicate a bad received physical layer frame. In one particular implementation of the fast reverse feedback-signaling channel, the ACK bit is punctured onto one of the reverse physical channels used by the mobile station. For example, the reverse pilot channel may be used such that the ACK bit is punctured into the reverse pilot channel and extracted at the transmit side. Another potential implementation is to use the reverse dedicated control channel (R-DCCH) to carry this one bit ACK information.

Figure 6:
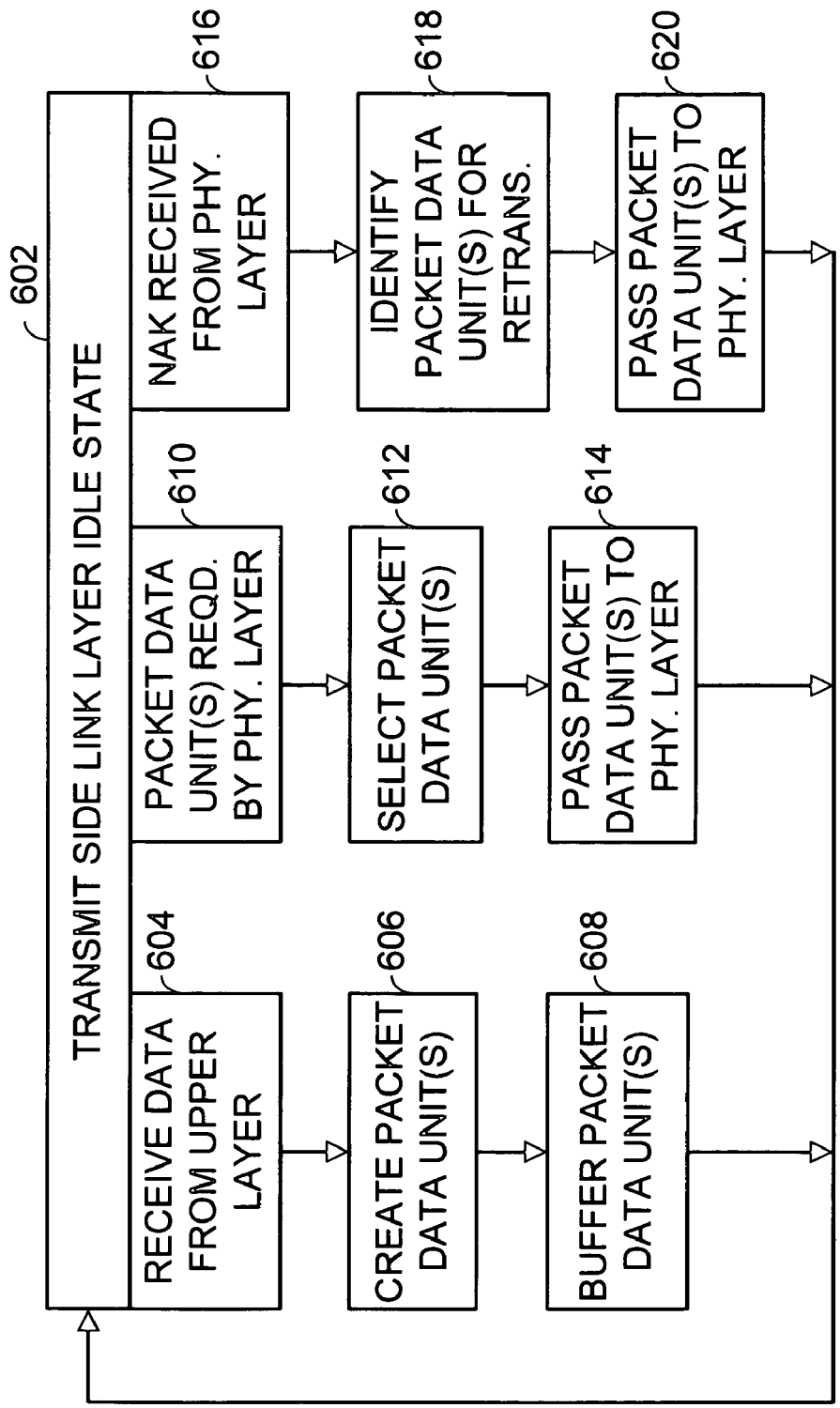
FIG. 6 is a logic diagram illustrating transmit side link layer operations according to the present invention.

FIG. 6 is a logic diagram illustrating transmit side link layer operations according to the present invention. As shown in FIG. 6, the transmit side link layer remains in an idle state until one of a number of particular events occurs (step 602). Of course, additional events may occur to cause the receive side link layer to operate and perform a variety of operations. Only operations relative to the present invention are described herein with reference to FIG. 6.

In a first operation, the transmit side link layer receives data from an upper layer. For example, as was shown in FIG. 2, the link layer may receive data from any of the higher layers in the protocol stack. Further as was particularly shown in FIG. 3A, the transmit side link layer may receive data from the IP/PPP layers. Upon receipt of data from an upper layer, the transmit side link layer creates packet data unit that contain the higher layer data (step 606). The packet data units created are then buffered in a transmit buffer (Step 608). In creating these packet data units, the transmit side uniquely identifies each packet data unit with a sequence number. Typically, the sequence numbers will be created in order by the transmit side link layer. As will be further described with reference to FIG. 7 through 10, these sequence numbers are employed according to the present invention to support the dual layer ARQ operations.

As a second operation by the transmit side link layer from the idle state, the transmit side link layer interacts with the transmit side physical layer to pass packet data units to the physical layer (step 610). Via this interaction, the transmit side link layer determines that the transmit side physical layer requires data. Then, based upon an interaction, the transmit side link layer selects packet data units to pass to the physical layer (step 612). After selection, the transmit side link layer passes the packet data units to the physical layer (step 614).

In another operation according to the present invention, the transmit side link layer receives a negative acknowledgement (NAK) from its corresponding physical layer (step 616). This NAK was created and transmitted by the receive side link layer. Based on the contents of this NAK, the transmit side link layer will identify a packet data unit or units for retransmission (step 618). In one embodiment, the NAK will include one or more sequence numbers of link layer packet data units that are missing at the receive side and for whom physical layer data recovery operations have failed. When this occurs, the transmit side link layer will pass the missing or erroneous packet data units to the physical layer for retransmission (step 620).

Figure 7:
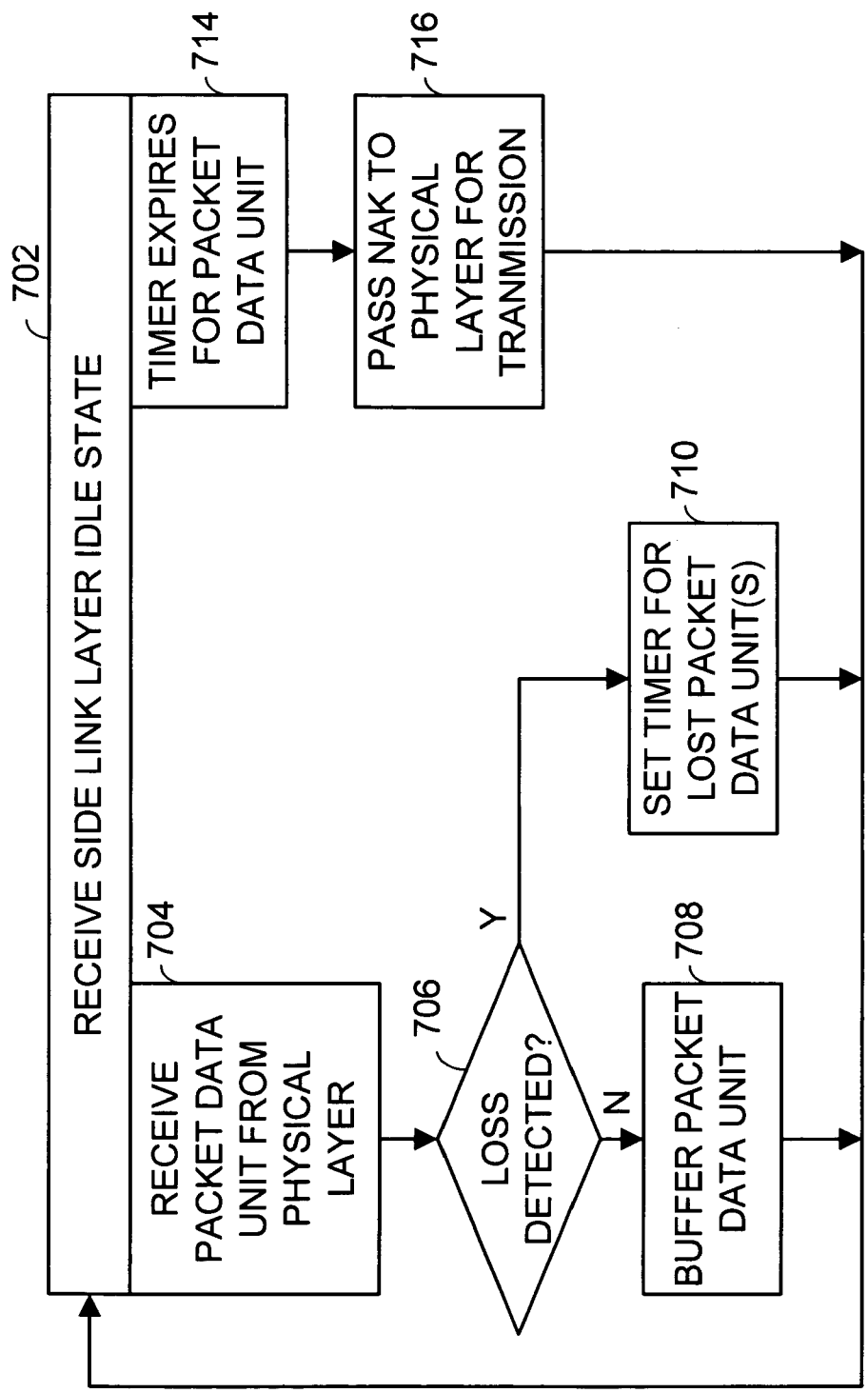
FIG. 7 is a logic diagram illustrating receive side link layer operations according to the present invention.

FIG. 7 is a logic diagram illustrating receive side link layer operations according to the present invention. As shown in FIG. 7, receive side link layer operations also reside in an idle state until particular operations commence (Step 702). However, as was also the case with FIG. 6, the receive side link layer will perform operations in addition to those described with reference to FIG. 7. Further, as previously discussed, any wireless device may implement the teachings of the present invention both on the transmit side and the receive side. Thus, the description of operations of FIGS. 4, 5, 6, and 7 may all be implemented on a single wireless device.

The receive side link layer receives packet data units from its corresponding physical layer. In such case, the receive side link layer considers one packet data unit at a time that it receives from the physical layer (step 704). Upon the receipt of a packet data unit, the receive side link layer determines whether any packet data units have been lost (step 706). Because the receive side link layer keeps a history of the sequence numbers of packet data units it receives, it detects the loss of a packet data unit by a gap or discontinuity in the sequence numbers of the packet data units it receives from the physical layer. The receive side link layer may detect a single lost packet data unit or multiple lost packet data units when considering the receipt of any particular packet data unit from the physical layer.

If no loss is detected at step 706, the receive side link layer buffers the packet data unit in its resequencing buffer. However, if loss is detected at step 706, the receive side link layer sets a timer for each lost packet data unit that it detects (step 710).

When a loss is detected by the receive side link layer, the physical layer ARQ operations may still be attempting to recover the physical layer frame that has been lost and that contains one or more of the lost link layer packet data units. In order to avoid unnecessary generation of NAKs and the resultant link layer retransmission, a timer is set that delays the generation of NAKs until a period of time has passed that allows the physical layer to recover lost physical layer frames. In one particular embodiment of the present invention, the value of the delay timer set for the lost packet data unit or units corresponds to the latency of the N retransmissions performed by the physical layer ARQ operations.

When any of the timers expires that has been set for lost data packet units (step 714), the receive side link layer sends a NAK to the physical layer for transmission across the wireless link (step 716). This NAK will be received by the transmit side link layer as was described at step 616 and will be serviced accordingly.

Figure 8:
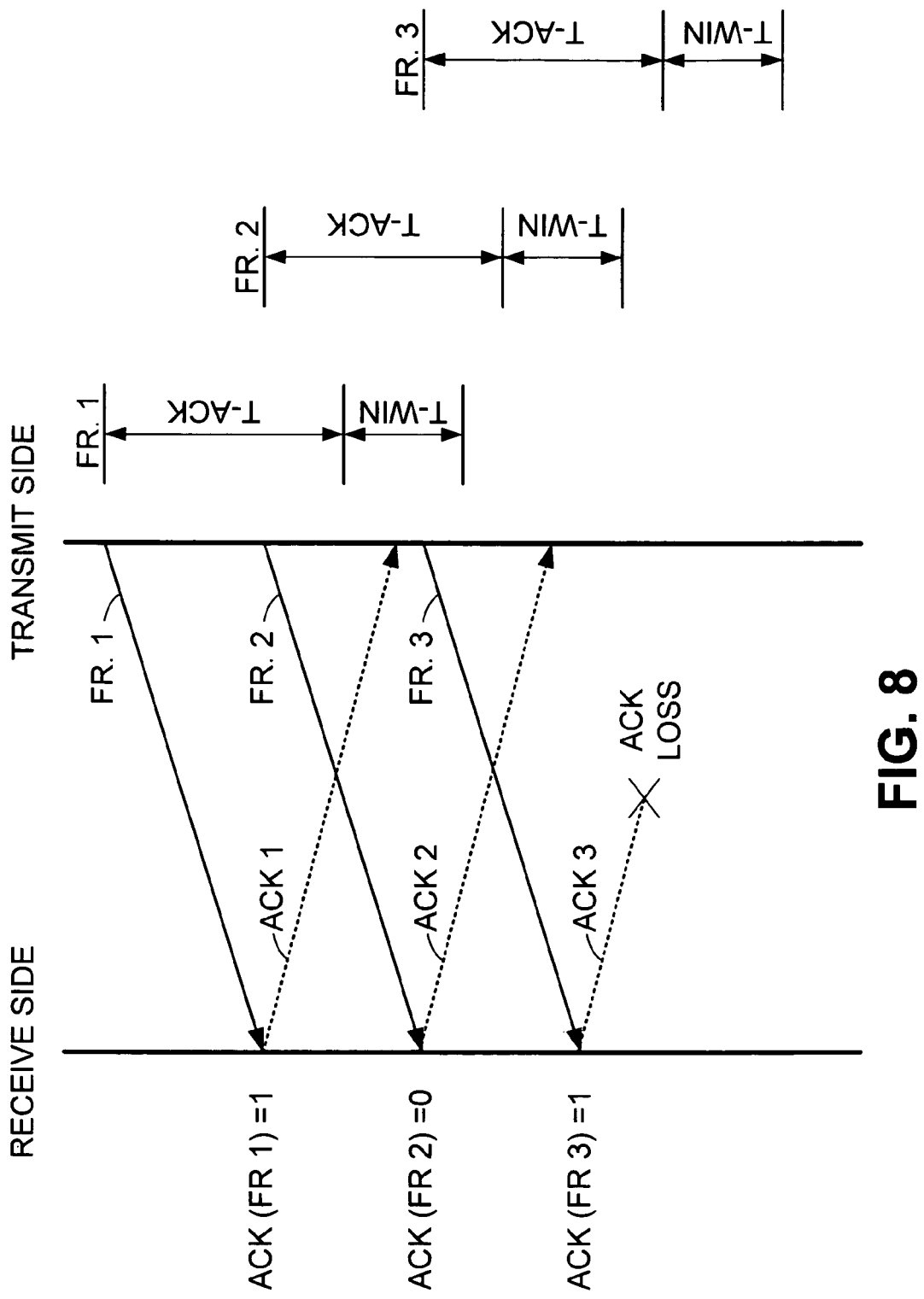
FIG. 8 is a data flow diagram illustrating operation according to a first aspect of the present invention.

FIG. 8 is a data flow diagram illustrating operation according to a first aspect of the present invention. FIG. 8 shows the physical layer ARQ mechanism as was described with reference to FIGS. 4 and 5. However, the reader should understand that the operation of FIG. 8 is simply one example that may be performed according to the present invention.

As shown, physical layer frame 1 is sent across a wireless link between a transmit side and a receive side. Note that physical layer frames are not labeled and the labels provided herein are for illustrative purposes only. Upon receipt of physical layer frame 1, the receive side physical layer determines that the physical layer frame is error free and sends a positive acknowledgment (ACK 1) to the transmit side protocol layer across the wireless link.

Upon transmission of physical layer frame 1, the transmit side physical layer initiates a delay period indicated as T-ACK. At the conclusion of this delay period T-ACK, the transmit side physical layer expects to receive an acknowledgment for physical layer frame 1. The transmit side physical layer expects to receive an acknowledgment within a window T-WIN at the conclusion of T-ACK. Both T-ACK and T-WIN are selected based upon the inherent delay in transmission to the receive side, processing by the receive side, and transmission of the ACK from the receive side to the transmit side.

The transmission, receipt, ACK generation, and ACK transmission process is not immediate, but instead occurs over time. Components of delay in the ACK process include an inherent delay in transmission of the physical layer frame from the transmit side to the receive side, receipt of the physical layer frame at the receive side, determining whether the physical layer frame is good or bad by the receive side, generation of an ACK by the receive side, and an inherent delay in the transmission of the ACK to the transmit side. Thus, a valid ACK for a particular layer frame will not be received by the transmit side until before the expiration of a particular period of time, e.g., T-ACK. Further, a valid ACK for a particular physical layer frame will not be received after a particular period of time, e.g., (T-ACK+T-WIN).

In the example of FIG. 8, acknowledgment of physical layer frame 1 is positive and is received within the period T-WIN that commenced after the delay period T-ACK corresponding physical layer frame 1. This particular example represents the successful transmission, receipt, and acknowledgement of a physical layer frame.

The transmit side physical layer transmits physical layer frame 2 as shown. Physical layer frame 2, however, is corrupted in its transmission to the receive side and is erroneously received. In such case, the receive side physical layer sends an acknowledgment for physical layer frame 2 to the transmit side physical layer. This acknowledgment is in the negative to indicate that physical layer frame 2 was not correctly received by the receive side physical layer.

Upon transmission of physical layer frame 2 across the wireless link, the transmit side physical layer also initiates a T-ACK delay period and then awaits an acknowledgment within a period T-WIN after the expiration of the period T-ACK. In the example of FIG. 8, the transmit side physical layer receives a negative acknowledgment within the window T-WIN and determines that physical layer frame 2 must again be transmitted because it was not correctly received. Thus, this particular example represents an unsuccessful transmission and successful negative acknowledgement of the unsuccessful transmission.

Physical layer frame 3 was transmitted after physical layer frame 2 was transmitted and was correctly received by the receive side physical layer. Thus, the receive side physical layer sends a positive acknowledgment to the transmit side physical layer. However, the positive acknowledgment is lost in transmission and does not reach the transmit side physical layer. Upon its transmission of physical layer frame 3, the transmit side physical layer initiates a delay period T-ACK and then awaits an acknowledgment within a period T-WIN following the expiration of T-ACK. Because the transmit side physical layer did not receive any acknowledgment during the T-WIN, it also initiates error recovery for physical layer frame 3. Thus, this particular example represents a successful transmission and an unsuccessful positive acknowledgement of the successful transmission.

Figure 9:
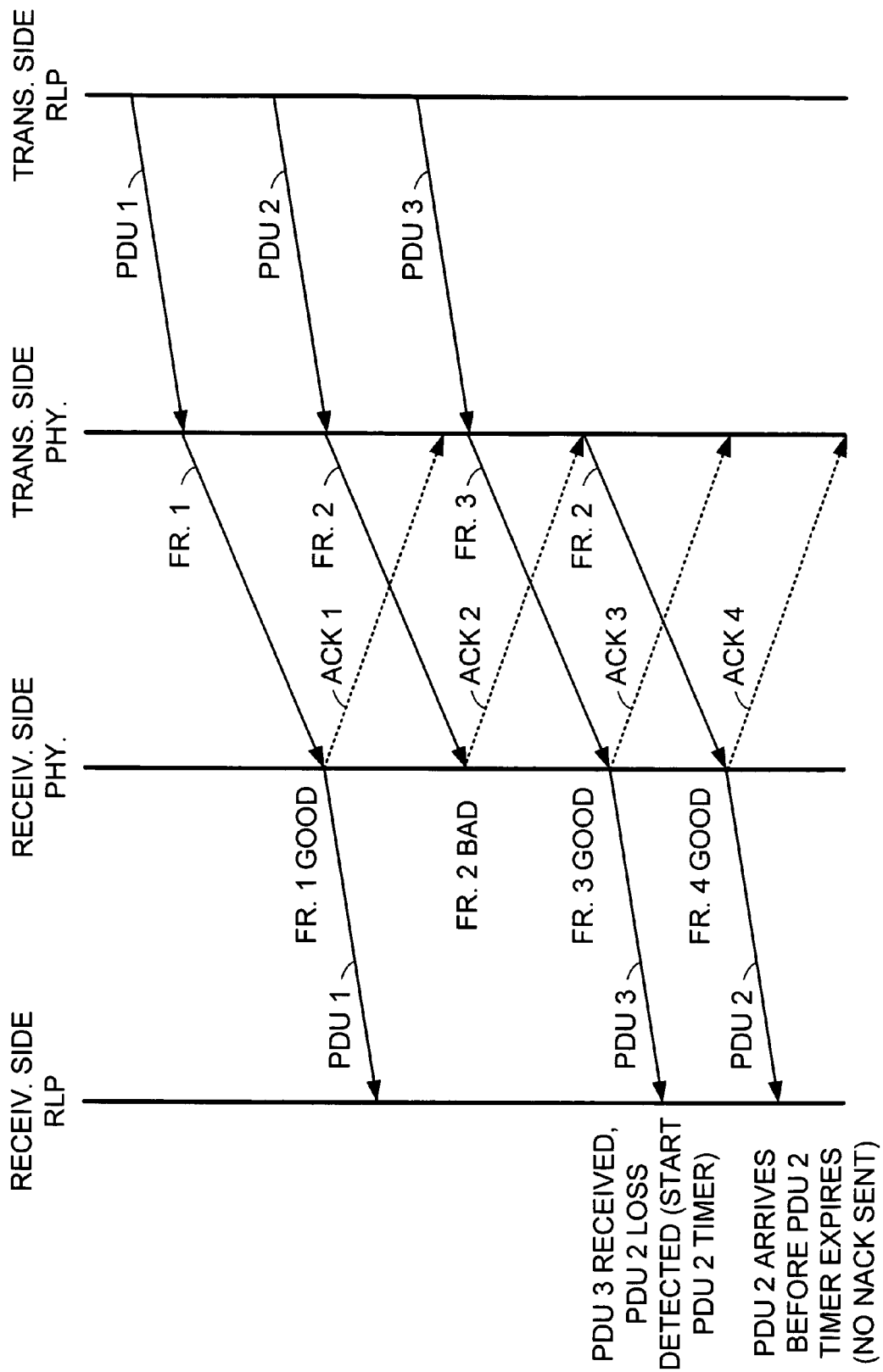
FIG. 9 is a data flow diagram illustrating operation according to a second aspect of the present invention.

FIG. 9 is a data flow diagram illustrating operation according to a second aspect of the present invention. In the operation of FIG. 9, the ARQ operations of the physical layer and the link layer on both the transmit side and receive side interact to cause error recovery operations. In the particular example of FIG. 9, a simplistic assumption that a single packet data unit corresponds to a single physical layer frame has been made. However as was previously described, such operation is not always the case and multiple packet data units may be contained in a single physical layer frame. In a start of transmission, the transmit side link layer passes packet data unit 1 to the transmit side physical layer. The transmit side physical layer packages the packet data unit 1 into physical layer frame 1 and transmits physical layer frame 1 across the wireless link to the receive side. The receive side physical layer receives physical layer frame 1, sends a positive acknowledgment to the transmit side physical layer and also passes packet data unit 1 to the receive side link layer.

The transmit side link layer passes packet data unit 2 to the transmit side physical layer which packages packet data unit 2 into physical layer frame 2. The transmit side physical layer then transmits physical layer frame 2 to the receive side physical layer. However, physical layer frame 2 is a bad physical layer frame upon receipt and a negative acknowledgment is sent by the receive side physical layer for the frame.

On the transmit side, the transmit side link layer passes packet data unit 3 to the transmit side physical layer which places packet data unit 3 into physical layer frame 3 and transmits physical layer frame 3 across the wireless link of the receive side physical layer. The receive side physical layer receives physical layer frame 3 in a good condition and then passes the packet data unit 3 contained in physical layer frame 3 to the receive side link layer. Upon receipt of packet data unit 3, the receive side link layer detects a loss because it was expecting to receive packet data unit 2. Thus, the RLP layer starts a timer corresponding to packet data unit 2.

Upon the negative acknowledgment for physical layer frame 2, the transmit side physical layer frame retransmits physical layer frame 2 and it is received successfully by the receive side physical layer. The receive side physical layer then extracts packet data unit 2 from the retransmitted physical layer frame and passes packet data unit 2 to the receive side link layer. Because packet data unit 2 is received by the receive side link layer prior to the expiration of a timer set for packet data unit 2, the receive side link layer does not send a NAK requesting retransmission of packet data unit 2.

Thus, the operation of FIG. 9 illustrates an example wherein error recovery at the physical layer and delayed error recovery operations at the link layer preclude unneeded error recovery by the link layer. Thus, the error recovery is swift, accurate and does not consume overhead.

Figure 10:
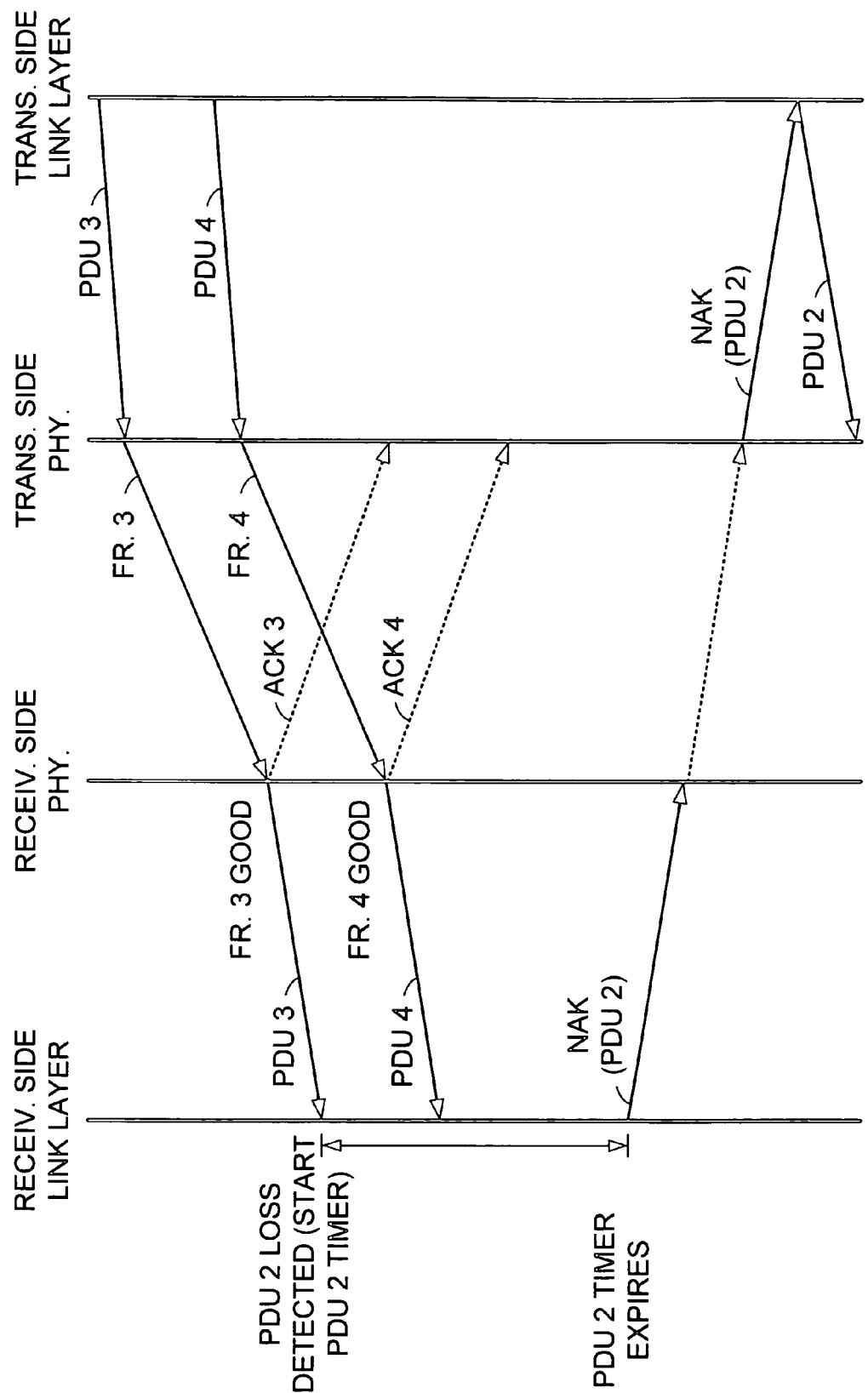
FIG. 10 is a data flow diagram illustrating operation according to a third aspect of the present invention.

FIG. 10 is a data flow diagram illustrating operation according to a third aspect of the present invention. As shown in FIG. 10, the transmit side link layer passes packet data unit 3 to the transmit side physical layer, which places packet data unit 3 into physical layer frame 3. Physical layer frame 3 is successfully transmitted across the wireless link to the received side physical layer. The receive side physical layer extracts packet data unit 3 from physical layer frame 3 and passes packet data unit 3 to the receive side RLP layer. However, because the receive side RLP layer was expecting packet data unit 2, it has detected loss and starts a timer corresponding to packet data unit 2.

Transmission continues with transmit side link layer passing packet data unit 4 to transmit side physical layer. Transmit side physical layer places packet data unit 4 into a physical layer frame and successfully transmits physical layer frame 4 across the wireless link to receive side physical layer. The receive side physical layer then extracts packet data unit 4 from physical layer frame 4 and passes packet data unit 4 to the receive side link layer.

After a period of time, the timer that was set for packet data unit 2 expires, with such expiration occurring before its successful receipt of packet data unit 2. In this case, the receive side RLP layer sends a NAK in which it identifies packet data unit 2 by the sequence number of packet data unit 2. The NAK is passed via the receive side physical layer to the transmit side physical layer and then to the transmit side link layer. In response to the NAK identifying packet data unit 2, the transmit side link layer passes a copy of packet data unit 2 to the transmit side physical layer. According to this example of FIG. 10, the link layer only initiates its ARQ operations after the ARQ operations of the physical layer have failed.

The principles of the present invention may be applied to mobility scenarios when a mobile station moves from one cell site to another cell site or from one transmitter to another transmitter. In such case, the mobile station may set a timer therein to allow for physical layer recovery operations to complete before switching over to the new base station. Alternatively, the mobile station may switch to the new base station without waiting for physical layer frames to arrive from the prior base station. In such case, link layer retransmissions will be triggered after a delay timeout to recover any link layer packet data units that were not received by the mobile station.

As was previously described, the principles of the present invention may be applied when multiple link layer instances share the same physical layer. In such case, a particular physical layer frame may correspond to multiple users' link layer packet data units. In this particular operation, each of the mobile stations will send an ACK that corresponds to the physical layer frame. When positive ACKs are received from each of the mobile stations, no additional retransmissions are required. However, when a negative acknowledgment is received from any one of the mobile stations, the base station must decide whether or not and how to retransmit physical layer frames. In one operation, the base station retransmits the whole physical layer frame as long as at least one of the ACKs received is negative. This scenario may be extended to cover a situation when any of the acknowledgments is lost in its transmission.

In an alternate operation, the base station retransmits only those physical layer sub-blocks that correspond to the link layer packet data units of the mobile station that sends a negative ACK or that does not respond with an ACK. Other parts of the physical layer frame may be null or may be used for repetition coding of the physical layer sub-block. Further, unused portions of the physical layer frame may be multiplexed with other new link layer packet data units.

As still a further implementation, the base station does not retransmit physical layer frames as long as a specific portion or a specific percentage of the serviced users respond with positive acknowledgments. In such case, error recovery is performed via link layer action. The proportion of users responding with an acknowledgment will be selected based upon the total number serviced by the physical layer and other considerations.

Figure 11:
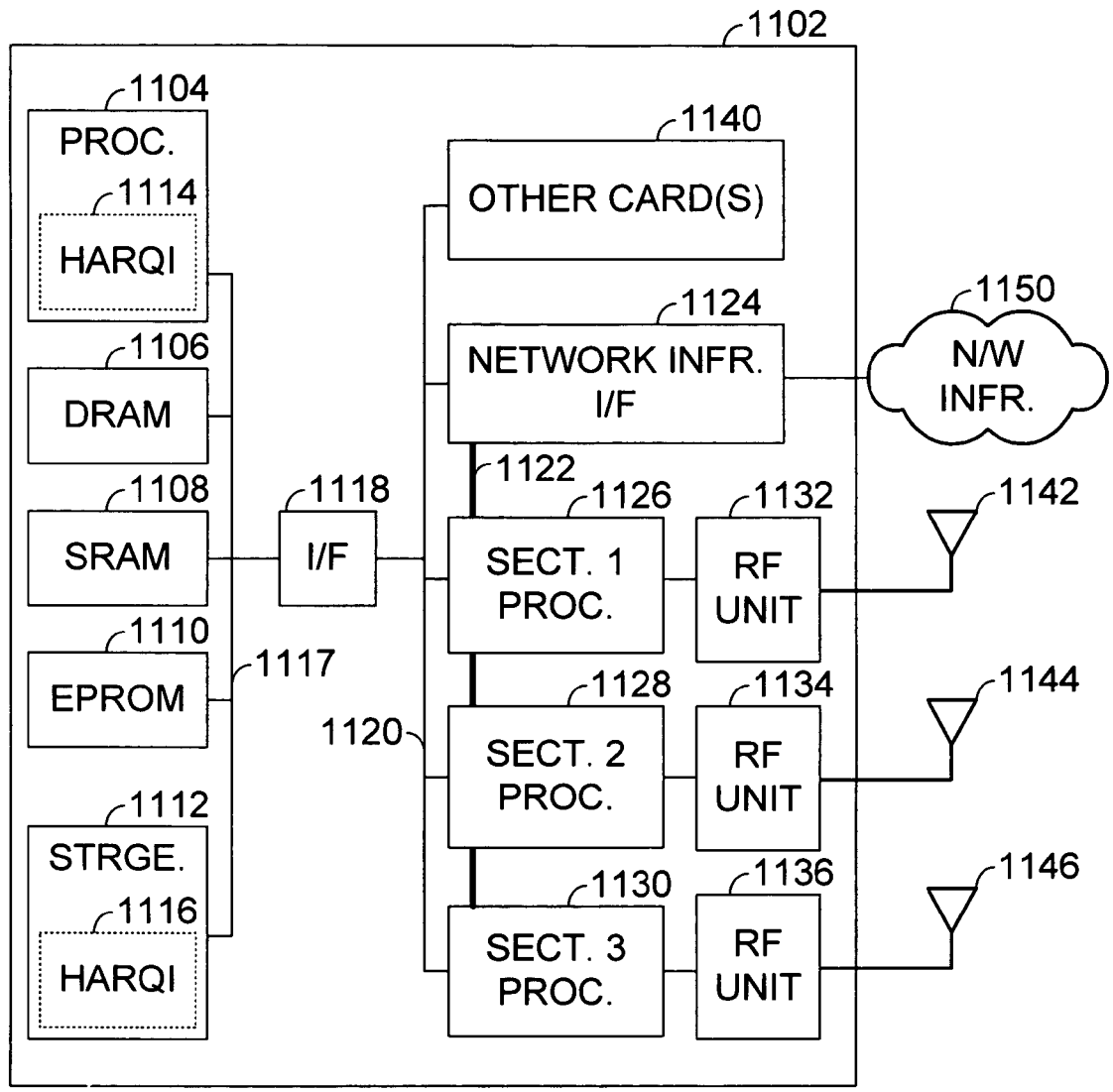
FIG. 11 is a block diagram illustrating a base station constructed according to the present invention.

FIG. 11 is a block diagram illustrating a base station 1102 constructed according to the present invention. The base station 1102 supports an operating protocol, e.g., IS-95A, IS-95B, IS-2000, GSM-EDGE, and/or various 3G and 4G standards that are compatible with the teachings of the present invention, with our without modification thereto. However, in other embodiments, the base station 1102 supports other operating standards. The base station 1102 supports protocol layer operations such as those described with reference to FIGS. 2 and/or 3A.

Figure 12:
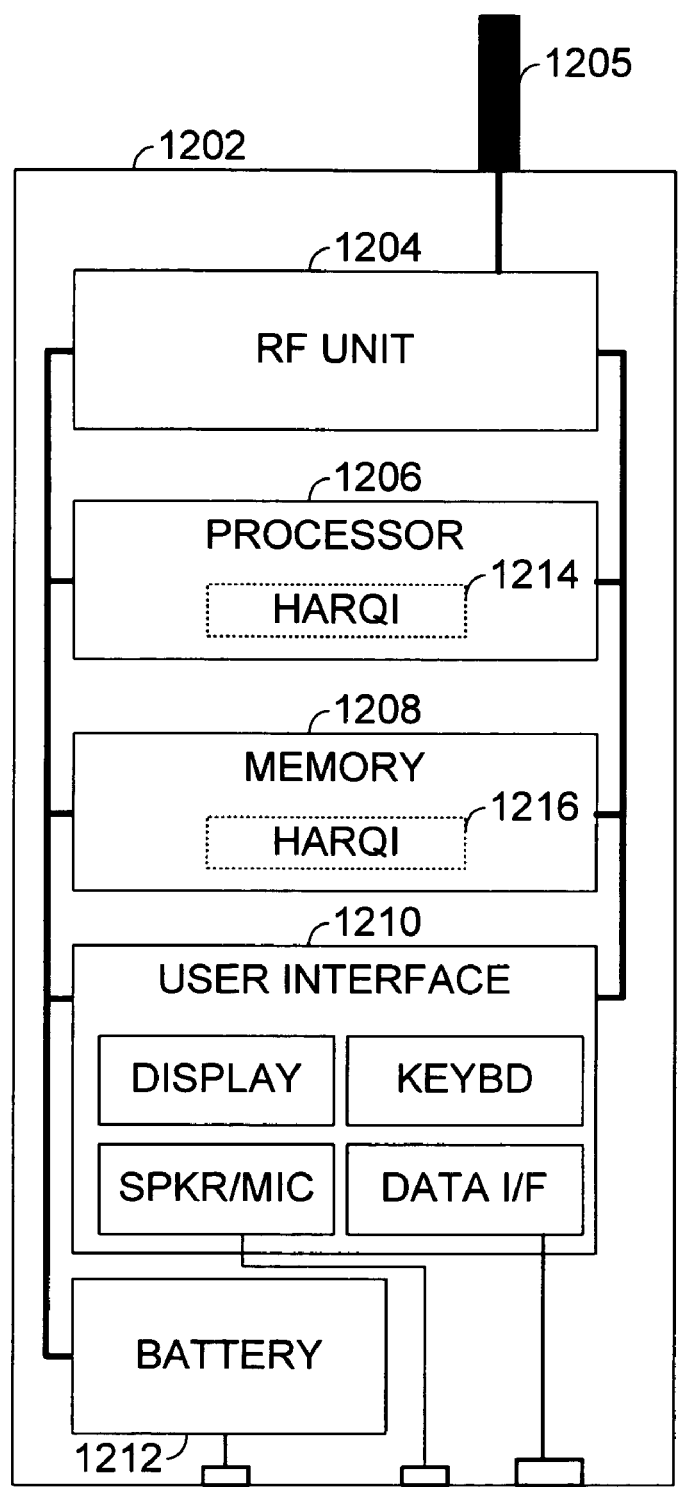
FIG. 12 is a block diagram illustrating a mobile station constructed according to the present invention.

The base station 1102 includes a processor 1104, dynamic RAM 1106, static RAM 1108, EPROM 1110, and at least one data storage device 1112, such as a hard drive, optical drive, tape drive, etc. These components (which may be contained on a peripheral processing card or module) intercouple via a local bus 1117 and couple to a peripheral bus 1120 (which may be a back plane) via an interface 1118. Various peripheral cards couple to the peripheral bus 1120. These peripheral cards include a network infrastructure interface card 1124, which couples the base station 1102 to the wireless network infrastructure 1150. Digital processing cards 1126, 1128, and 1130 couple to Radio Frequency (RF) units 1132, 1134, and 1136, respectively. Each of these digital processing cards 1126, 1128, and 1130 performs digital processing for a respective sector, e.g., sector 1, sector 2, or sector 3, serviced by the base station 1102. Thus, each of the digital processing cards 1126, 1128, and 1130 will perform some or all of processing operations described with reference to FIGS. 4-7. The RF units 1132, 1134, and 1136 couple to antennas 1142, 1144, and 1146, respectively, and support wireless communication between the base station 1102 and mobile stations (the structure of which is shown in FIG. 12). The base station 1102 may include other cards 1140 as well.

Hybrid Automatic Retransmission reQuest Instructions (HARQI) 1116 are stored in storage 1112. The HARQI 1116 are downloaded to the processor 1104 and/or the DRAM 1106 as HARQI 1114 for execution by the processor 1104. While the HARQI 1116 are shown to reside within storage 1112 contained in base station 1102, the HARQI 1116 may be loaded onto portable media such as magnetic media, optical media, or electronic media. Further, the HARQI 1116 may be electronically transmitted from one computer to another across a data communication path. These embodiments of the HARQI are all within the spirit and scope of the present invention.

Upon execution of the HARQI 1114, the base station 1102 performs operations according to the present invention previously described herein with reference to FIGS. 1-10. The HARQI 1116 may also be partially executed by the digital processing cards 1126, 1128, and 1130 and/or other components of the base station 1102. Further, the structure of the base station 1102 illustrated is only one of many varied base station structures that could be operated according to the teachings of the present invention.

FIG. 12 is a block diagram illustrating a mobile station 1202 constructed according to the present invention that performs the operations previously described herein. The mobile station 1202 supports an operating protocol, e.g., IS-95A, IS-95B, IS-2000, GSM-EDGE, and/or various 3G and 4G standards that are compatible with the teachings of the present invention, with our without modification thereto. However, in other embodiments, the mobile station 1202 supports other operating standards.

The mobile station 1202 includes an RF unit 1204, a processor 1206, and a memory 1208. The RF unit 1204 couples to an antenna 1205 that may be located internal or external to the case of the mobile station 1202. The processor 1206 may be an Application Specific Integrated Circuit (ASIC) or another type of processor that is capable of operating the mobile station 1202 according to the present invention. The memory 1208 includes both static and dynamic components, e.g., DRAM, SRAM, ROM, EEPROM, etc. In some embodiments, the memory 1208 may be partially or fully contained upon an ASIC that also includes the processor 1206. A user interface 1210 includes a display, a keyboard, a speaker, a microphone, and a data interface, and may include other user interface components. The RF unit 1204, the processor 1206, the memory 1208, and the user interface 1210 couple via one or more communication buses/links. A battery 1212 also couples to and powers the RF unit 1204, the processor 1206, the memory 1208, and the user interface 1210.

Hybrid Automatic Retransmission reQuest Instructions (HARQI) 1216 are stored in memory 1208. The HARQI 1216 are downloaded to the processor 1206 as HARQI 1214 for execution by the processor 1206. The HARQI 1216 may also be partially executed by the RF unit 1204 in some embodiments. The HARQI 1216 may be programmed into the mobile station 1202 at the time of manufacture, during a service provisioning operation, such as an over-the-air service provisioning operation, or during a parameter updating operation. Upon their execution, the HARQI 1214 cause the mobile station 1202 to perform operations according to the present invention previously described with reference to FIGS. 1-8.

The structure of the mobile station 1202 illustrated is only an example of one mobile station structure. Many other varied mobile station structures could be operated according to the teachings of the present invention. Upon execution of the HARQI 1214, the mobile station 1202 performs operations according to the present invention previously described herein in servicing data communications.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claims is:

1. A method for transferring data from a source wireless device to a destination wireless device comprising:
    a physical layer of the destination wireless device receiving physical layer data from a physical layer of the source wireless device;
    when the physical layer of the destination wireless device does not correctly receive the physical layer data, the destination wireless device interacting with the source wireless device in performing physical layer retransmission operations in an attempt of the destination wireless device to correctly re-receive the physical layer data; and
    when the upper layer of the destination wireless device does not receive upper layer packet data when expected, the destination wireless device delaying initiation of upper layer retransmission operations for the upper layer packet data until the physical layer retransmission operations for the physical layer data carrying the upper layer packet data have completed.

2. The method of claim 1, wherein the physical layer data includes a plurality of sub-blocks, each of which may be separately transmitted from the source wireless device to the destination wireless device.

3. The method of claim 1, further comprising:
    the upper layer of the destination wireless device sending a positive acknowledgement to an upper layer of the source wireless device upon a successful receipt of the upper layer packet data.

4. The method of claim 1, further comprising:
    the upper layer of the destination wireless device sending a negative acknowledgement to an upper layer of the source wireless device when the upper layer of the destination wireless device does not receive the upper layer packet data when expected.

5. The method of claim 1, wherein the upper layer of the destination wireless device determines that it does not receive the upper layer packet data carried by the physical layer data when expected by comparing a sequence number of received upper layer packet data to the sequence number of expected upper layer packet data.

6. The method of claim 1, wherein the upper layer comprises a link layer.

7. The method of claim 1, wherein in performing physical layer retransmission operations acknowledgement signals are communicated on a fast reverse feedback-signaling channel.

8. The method of claim 1, wherein delaying initiation of upper layer retransmission operations for the upper layer packet data until the physical layer retransmission operations for the physical layer data carrying the upper layer packet data have completed includes:
    setting a timer to initiate the delaying; and
    upon expiration of the timer concluding the delaying.

9. The method of claim 1, wherein the source wireless device initiates delay of the upper layer retransmission operations.

10. The method of claim 1, wherein the destination wireless device initiates delay of the upper layer retransmission operations.

11. The method of claim 1, wherein the physical layer retransmission operations include ACK based notifications.

12. The method of claim 1, wherein the physical layer retransmission operations include NACK based notifications.

13. A wireless device that is operable to transmit data to a destination wireless device, the wireless device comprising:
    an antenna;
    a radio frequency unit communicatively coupled to the antenna; and
    at least one digital processor communicatively coupled to the radio frequency unit and operable to cause the wireless device to:
        perform physical layer operations including physical layer retransmission operations;
        perform upper layer operations including upper layer retransmission operations; and
        coordinate the physical layer retransmission operations with the upper layer retransmission operations by delaying initiation of the upper layer retransmission operations for upper layer packet data until the physical layer retransmission operations for physical layer data carrying the upper layer packet data have completed.

14. The wireless device of claim 13, wherein the at least one digital processor is further operable to cause the wireless device to, in performing the upper layer operations:
    receive a negative acknowledgement from the destination wireless device indicating that an upper layer of the destination wireless device did not receive the upper layer packet data when expected.

15. The wireless device of claim 13, wherein the physical layer data includes a plurality of sub-blocks, each of which may be separately transmitted from the source wireless device to the destination wireless device.

16. The wireless device of claim 13, wherein the upper layer comprises a link layer.

17. The wireless device of claim 13, wherein in performing physical layer retransmission operations the wireless device is operable to communicate acknowledgement signals on a fast reverse feedback-signaling channel.

18. The wireless device of claim 13, wherein the at least one digital processor is further operable to cause the wireless device to, in performing the upper layer operations, receive a positive acknowledgement from the destination wireless device indication that an upper layer of the destination wireless device successfully receive the upper layer packet data.

19. The wireless device of claim 13, wherein delaying initiation of upper layer retransmission operations for the upper layer packet data until the physical layer retransmission operations for the physical layer data carrying the upper layer packet data have completed includes:
    setting a timer to initiate the delaying; and
    upon expiration of the timer concluding the delaying.

20. A method for transferring data from a source wireless device to a destination wireless device comprising:
    a physical layer of the destination wireless device receiving physical layer data from a physical layer of the source wireless device;
    when the physical layer of the destination wireless device does not correctly receive the physical layer data, the source wireless device and the destination wireless device performing physical layer retransmission operations in an attempt of the destination wireless device to correctly re-receive the physical layer data;

when the upper layer of the destination wireless device does not receive the upper layer packet data when expected, the upper layer of the destination wireless device sending a negative acknowledgement to an upper layer of the source wireless device;

the upper layer of the source wireless device receiving the negative acknowledgement from the upper layer of the destination wireless device; and the upper layer of the source wireless device delaying initiation of upper layer retransmission operations for the upper layer packet data until the physical layer retransmission operations for the physical layer data carrying the upper layer packet data have completed.

21. The method of claim 20, wherein the physical layer data includes a plurality of sub-blocks, each of which may be separately transmitted from the source wireless device to the destination wireless device.

22. The method of claim 20, further comprising the upper layer of the destination wireless device determining that it does not receive the upper layer packet data when expected by comparing a sequence number of received upper layer packet data to the sequence number of expected upper layer packet data.

23. The method of claim 20, wherein the upper layer comprises a link layer.

24. The method of claim 20, wherein in performing physical layer retransmission operations acknowledgement signals are communicated on a fast reverse feedback-signaling channel.

25. The method of claim 20, wherein delaying initiation of upper layer retransmission operations for the upper layer packet data until the physical layer retransmission operations for the physical layer data carrying the upper layer packet data have completed includes:

setting a timer to initiate the delaying; and upon expiration of the timer concluding the delaying.

26. The method of claim 20, wherein the source wireless device initiates delay of the upper layer retransmission operations.

27. The method of claim 20, wherein the destination wireless device initiates delay of the upper layer retransmission operations.

28. The wireless device of claim 20, wherein delaying initiation of upper layer retransmission operations for the upper layer packet data until the physical layer retransmission operations for the physical layer data carrying the upper layer packet data have completed includes:

setting a timer to initiate the delaying; and upon expiration of the timer concluding the delaying.

29. The method of claim 20, wherein the physical layer retransmission operations include ACK based notifications.

30. The method of claim 20, wherein the physical layer retransmission operations include NACK based notifications.

31. A wireless device that is operable to receive data from a source wireless device, the wireless device comprising:

an antenna;

a radio frequency unit communicatively coupled to the antenna;

at least one digital processor communicatively coupled to the radio frequency unit and operable to implement physical layer and upper layer operations;

a physical layer operable:

to receive physical layer data from a physical layer of the source wireless device;

when not correctly receiving the physical layer data, perform physical layer retransmission operations in an attempt to correctly re-receive the physical layer data; and an upper layer operable to, when it does not receive the upper layer packet data when expected, delay initiation of upper layer retransmission operations for the upper layer packet data until the physical layer retransmission operations for the physical layer data carrying the upper layer packet data have completed.

32. The wireless device of claim 31, wherein the physical layer data includes a plurality of sub-blocks, each of which may be separately transmitted from the source wireless device to the destination wireless device.

33. The wireless device of claim 31, wherein the upper layer comprises a link layer.

34. The wireless device of claim 31, wherein in performing physical layer retransmission operations the wireless device is operable to communicate acknowledgement signals on a fast reverse feedback-signaling channel.

35. A method for transferring data from a source wireless device to a destination wireless device comprising:

a physical layer of the destination wireless device receiving physical layer data from a physical layer of the source wireless device;

when the physical layer of the destination wireless device does not correctly receive the physical layer data, the source wireless device and the destination wireless device performing physical layer retransmission operations in an attempt of the destination wireless device to correctly re-receive the physical layer data;

the upper layer of the source wireless device detecting that the destination wireless device did not receive the upper layer packet data when expected; and the upper layer of the source wireless device delaying initiation of upper layer retransmission operations for the upper layer packet data until the physical layer retransmission operations for the physical layer data carrying the upper layer packet data have completed.

36. The method of claim 35, wherein the physical layer data includes a plurality of sub-blocks, each of which may be separately transmitted from the source wireless device to the destination wireless device.

37. The method of claim 35, wherein the upper layer of the source wireless device detecting that the destination wireless device did not receive the upper layer packet data when expected comprises receiving a negative acknowledgement from the destination wireless device concerning the upper layer packet data.

38. The method of claim 35, wherein the upper layer of the source wireless device detecting that the destination wireless device did not receive the upper layer packet data when expected comprises failing to receive a positive acknowledgement from the destination wireless device concerning the upper layer packet data when expected.

39. The method of claim 35, wherein the upper layer comprises a link layer.

40. The method of claim 35, wherein in performing physical layer retransmission operations acknowledgement signals are communicated on a fast reverse feedback-signaling channel.

41. The method of claim 35, wherein delaying initiation of upper layer retransmission operations for the upper layer packet data until the physical layer retransmission operations for the physical layer data carrying the link layer packet data have completed includes:

setting a timer to initiate the delaying; and upon expiration of the timer concluding the delaying.

42. The method of claim 35, wherein the physical layer retransmission operations include ACK based notifications.

43. The method of claim 35, wherein the physical layer retransmission operations include NACK based notifications.

* * * * *

UNITED STATES PATENT AND TRADEMARK OFFICE
CERTIFICATE OF CORRECTION

PATENT NO. : 7,484,120 B2 Page 1 of 1
APPLICATION NO. : 11/168835
DATED : January 27, 2009
INVENTOR(S) : Mo-Han Fong et al.

It is certified that error appears in the above-identified patent and that said Letters Patent is hereby corrected as shown below:

Column 14, line 48, in Claim 18: replace "indication" with --indicating--.

Column 14, line 49, in Claim 18: replace "receive" with --received--.

Signed and Sealed this

Nineteenth Day of May, 2009

JOHN DOLL
*Acting Director of the United States Patent and Trademark Office*